(12) United States Patent
Sweeney et al.

(10) Patent No.: US 8,334,041 B2
(45) Date of Patent: Dec. 18, 2012

(54) STAIR DROP PAINT BARRIER PROTECTOR

(75) Inventors: Danny Sweeney, Apex, NC (US);
Michael Sherman, Mooresville, NC (US); James Dale, London, KY (US); William Lane Ball, Statesville, NC (US); Scott Pyle, Braselton, GA (US)

(73) Assignee: Zibra, LLC, Mooresville, NC (US)

( * ) Notice: Subject to any disclaimer, the term of this patent is extended or adjusted under 35 U.S.C. 154(b) by 216 days.

(21) Appl. No.: 12/951,037

(22) Filed: Nov. 20, 2010

(65) Prior Publication Data

US 2011/0135869 A1 Jun. 9, 2011

Related U.S. Application Data

(63) Continuation-in-part of application No. 12/950,993, filed on Nov. 19, 2010, now abandoned, which is a continuation-in-part of application No. 12/950,998, filed on Nov. 19, 2010, now abandoned.

(60) Provisional application No. 61/283,467, filed on Dec. 4, 2009.

(51) Int. Cl.
*B32B 3/16* (2006.01)
(52) U.S. Cl. .................................. 428/77; 52/3; 428/55
(58) Field of Classification Search .................. 428/77, 428/55; 52/3
See application file for complete search history.

(56) References Cited

U.S. PATENT DOCUMENTS

| | | |
|---|---|---|
| 4,822,669 A | 4/1989 | Roga |
| 5,173,346 A | 12/1992 | Middleton |
| 5,266,390 A | 11/1993 | Garland |
| 5,500,267 A | 3/1996 | Canning |
| 5,761,853 A | 6/1998 | Trosper et al. |
| 5,816,305 A | 10/1998 | May |
| 5,930,956 A | 8/1999 | Trosper et al. |
| 6,640,501 B1 | 11/2003 | Hussey |
| 6,815,036 B1 | 11/2004 | Romero |
| 6,911,407 B2 | 6/2005 | Sherrod et al. |
| 7,691,465 B2 | 4/2010 | Bukovitz et al. |
| 2005/0058803 A1 | 3/2005 | Bowden |
| 2005/0262781 A1 | 12/2005 | Hughes |
| 2008/0066389 A1* | 3/2008 | Siegel .................................. 52/3 |
| 2008/0066420 A1 | 3/2008 | May |
| 2010/0201046 A1 | 8/2010 | Orlych et al. |

OTHER PUBLICATIONS

Information Disclosure Statement (IDS) Letter Regarding Common Patent Application(s), dated Dec. 13, 2010.

* cited by examiner

*Primary Examiner* — Brent O'Hern
(74) *Attorney, Agent, or Firm* — Tillman Wright, PLLC; Chad D. Tillman

(57) ABSTRACT

A drop cloth includes: a sheet of material having a length substantially greater than its width; and a series of panels, each panel being connected to sheet along the length of the sheet. The panels are generally identical to one another and are equally spaced along the length of the sheet such that, when the drop cloth is applied to a staircase, a first panel of a pair of adjacent panels covers a horizontal section of the stairs and the other panel of the pair of adjacent panels covers a vertical section of the stairs, with a fabric area extending between the pair of adjacent panels and over a nose of a stair. The drop cloth can be used for protection against drips and spills when painting along a staircase. The drop cloth also can be used when painting along a wall of a room.

20 Claims, 19 Drawing Sheets

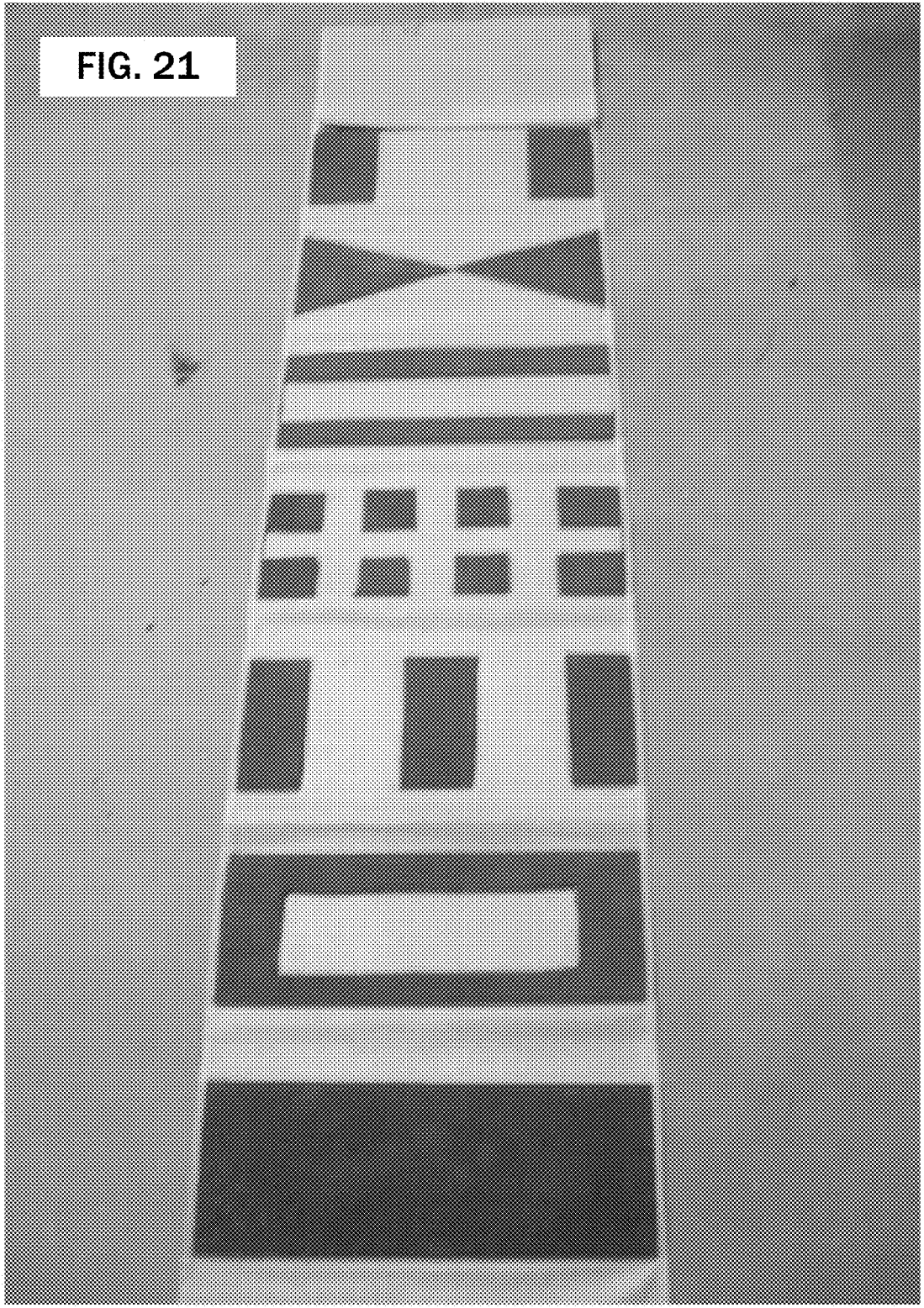

STAIR DROP PAINT BARRIER PROTECTOR

CROSS-REFERENCE TO RELATED APPLICATION

The present application is a U.S. continuation-in-part patent application of, and claims priority under 35 U.S.C. §120 to, U.S. patent application Ser. No. 12/950,993, filed Nov. 19, 2010, now abandoned which '993 application and any publication thereof and any patent issuing therefrom are incorporated herein by reference, and which '993 application is a U.S. nonprovisional patent application of, and claims priority under 35 U.S.C. §119(e) to, U.S. provisional patent application Ser. No. 61/283,467, filed Dec. 4, 2009, which '467 provisional patent application is incorporated by reference herein; and the present application is a U.S. continuation-in-part patent application of, and claims priority under 35 U.S.C. §120 to, U.S. patent application Ser. No. 12/950,998, filed Nov. 19, 2010, now abandoned incorporated herein by reference, which '998 application and any publication thereof and any patent issuing therefrom are incorporated herein by reference, and which '998 application is a U.S. nonprovisional patent application of, and claims priority under 35 U.S.C. §119(e) to, U.S. provisional patent application Ser. No. 61/283,467, filed Dec. 4, 2009, which '467 provisional patent application is incorporated by reference herein. The disclosure of the '467 application is contained within the Appendix, which is incorporated herein by reference. The Appendix further includes disclosure of additional paint barrier protectors, which is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to paint barrier protectors (sometimes referred to as drip barriers), and more specifically to new and improved paint barrier protectors for stairs.

There are a variety of paint barrier protectors. Perhaps the most commonly known and used are drop cloths. A conventional drop cloth typically consists of a large cloth that is laid over a floor, stairs, or a piece of furniture while a room is being painted, and is typically made from one of three different materials, i.e., canvas, paper, and plastic. Drop clothes made from each of these three materials provide differing benefits when used. Generally paper and plastic drop cloths are disposable, single-use apparatus, and are the least absorbent in comparison to canvas drop cloths. Canvas drop cloths are reuseable, and are the most absorbent of the three materials, but must be cleaned periodically and thus require maintenance.

Such drop cloths have common deficiencies. For one, they require what seems an inordinate amount of time to setup for use when preparing a room for painting. They similarly seem to require an inordinate amount of time to reposition during painting, and an inordinate amount of time to remove and fold up when the painting is finished. Typical drop cloths used today also do not have rigid straight edges, which is desirable for placing the drop cloths against walls and trim board. Typical drop cloths also are somewhat dangerous in that, when stepped upon, they are prone to slipping on hardwood floor, tile floors, and other flooring.

One or more embodiments of the present invention (but not necessarily all embodiments) address one or more of these aforementioned disadvantages of conventional drop cloths in common use.

SUMMARY OF THE INVENTION

The present invention includes many aspects and features. Moreover, while many aspects and features relate to, and are described in, the context of painting, the present invention is not limited to use only in painting, as will become apparent from the following summaries and detailed descriptions of aspects, features, and one or more embodiments of the present invention. For example, the present invention may be used during other forms of home improvement, wherein it is desired to protect a flooring or staircase with a covering.

In an aspect of the invention, a drop cloth includes: an elongate sheet of material; and a series of panels, each panel being connected to the sheet along the length of the sheet. The length of the sheet is substantially greater than its width.

In a feature of this aspect, the panels are generally identical to one another and are equally spaced along the length of the sheet such that, when the drop cloth is applied to a staircase, a first panel of a pair of adjacent panels covers a horizontal section of the stairs and the other panel of the pair of adjacent panels covers a vertical section of the stairs, with a fabric area extending between the pair of adjacent panels and over a nose of a stair.

In another feature, each panel is sewn to an underside of the sheet and is exposed on the underside of the sheet.

In another feature, each panel is adhered to an underside of the sheet and is exposed on the underside of the sheet.

In another feature, the series of panels consist of eleven panels.

In another feature, each panel consists of EVA.

In another feature, each panel is hard and preferably comprises an EVA (Ethylene vinyl acetate) material.

In another feature, each panel has the same rigidity, height, width, and thickness as each of the other panels of the series.

In another feature, each panel is at least semirigid.

In other features, the sheet has a length of about 101.25 inches and a width of about 18 inches; each panel has a thickness of about 5 mm; each panel is about 6.25 inches in length and about 18 inches in width; and the widthwise edges of adjacent panels are spaced from one another by about 3.25 inches.

In another feature, the sheet and each of the panels are sewn together in a manner that creates fabric hinges between the panels so as to allow the drop cloth to fold in the areas between the panels.

In another feature, outer edges of two end panels in the series of panels extend along and in proximity to opposite transverse end edges of the sheet, thereby defining rigid transverse ends of the drop cloth.

In another feature, a small extent of the lengthwise edge portions of the sheet are folded back over themselves and over the opposite transverse end edges of each panel, whereat each panel is sewn to the lengthwise edge portions of the sheet.

In another feature, each panel is sewn along its lengthwise edge portions to the sheet.

In another feature, the sheet comprises a combination of a nonwoven material and PE (polyethene) film.

In another feature, the sheet comprises a nonwoven fabric that defines the topside of the drop cloth, and a thermo bonded poly undercoat of the nonwoven fabric that provides a leak-proof barrier.

In another feature, a bottom side of each panel predominantly is exposed and provides resistance to sliding or slipping on hardwood floors, staircases, and tile surfaces.

In another feature, the rigidity of the panels is sufficient such that the drop cloth has a generally rigid straight edge for abutting against a floor board in a linear and snug manner for protecting a hardwood floor, staircase, or tile surface on which it is used against paint drips and spills.

In another feature, the rigidity of the panels is sufficient such that the drop cloth can be positioned and repositioned with one's foot by kicking and sliding it into position.

In another feature, the drop cloth further includes an elastic loop, strap, or handle which is sewn to the sheet, an end panel, or both, and by which the multiple panels can be bound together in a folded configuration when the drop cloth is not in use.

In another feature, the width of the drop cloth is configured to cover no more than about half of the width of a staircase.

Other aspects include the making of a drop cloth in accordance with one or more aspects or features disclosed herein (including the incorporated references), and the use of a drop cloth in accordance with one or more aspects or features disclosed herein (including the incorporated references).

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 2 is a photograph of a perspective view of a backside of a prototype stair drop paint barrier protector when in a fully unfolded configuration on top of flooring, in accordance with one or more aspects of the present invention.

FIG. 21 is a photograph of a perspective view of a backside of a demo stair drop paint barrier protector when in a fully unfolded configuration and positioned on a floor, wherein various different patterns of panels are shown, any one pattern of which (or any combination of which) could be used in a series with a sheet for making a wall drop paint barrier protector.

DETAILED DESCRIPTION

Figure 1A:
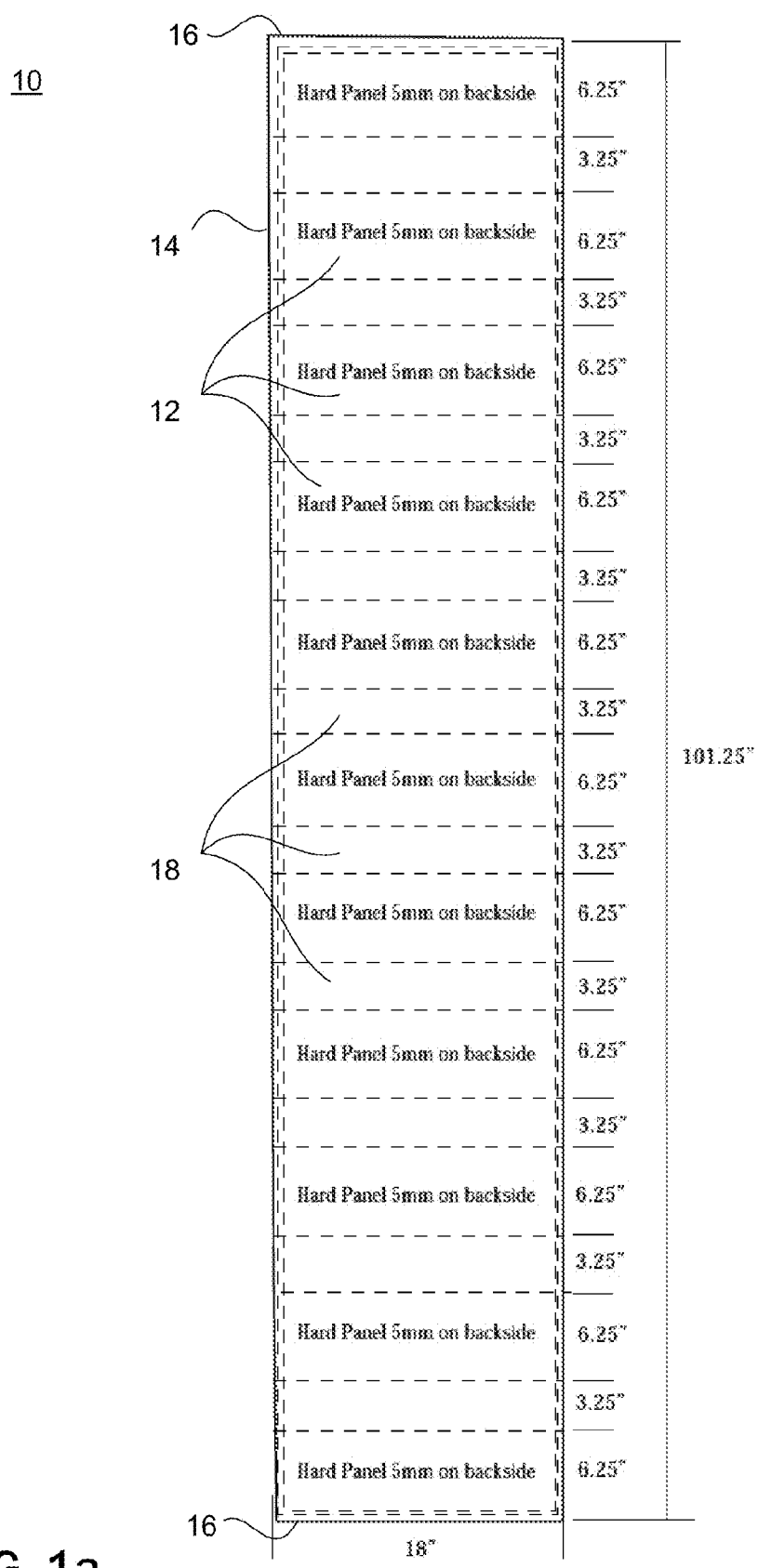
FIG. 1a is a schematic plan view of a topside of a preferred embodiment of a stair drop paint barrier protector when in a fully unfolded or extended configuration, in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the drawings, FIG. 1a is a schematic plan view of a topside of a preferred embodiment of a stair drop paint barrier protector 10 when in a fully unfolded or extended configuration, in accordance with one or more aspects of the present invention. Similarly, FIG. 1b is a schematic plan view of a backside of the stair drop paint barrier protector 10 when in the fully unfolded or extended configuration.

Figure 1B:
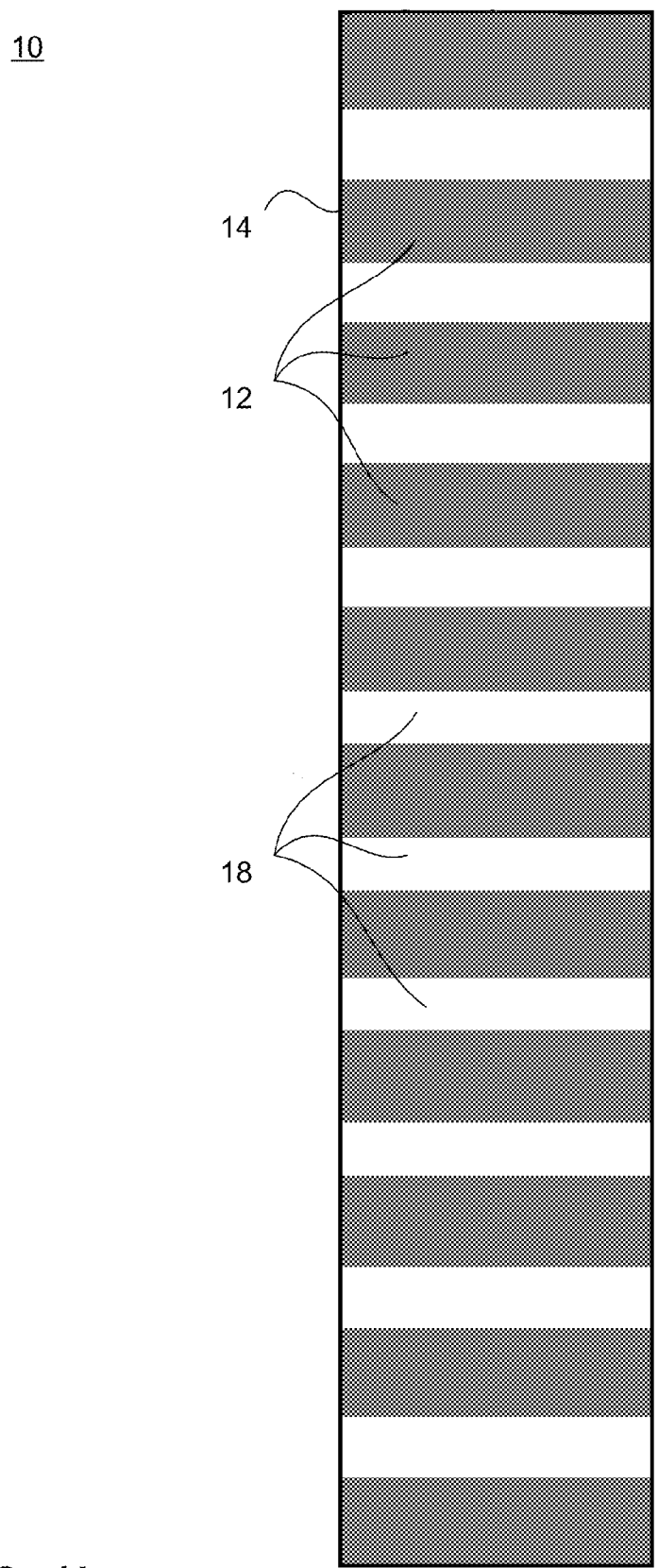
FIG. 1b is a schematic plan view of a backside of the stair drop paint barrier protector of FIG. 1a when in a fully unfolded or extended configuration.

As shown in FIGS. 1a and 1b, the stair drop paint barrier protector 10 (hereinafter referred to generally as a "drop cloth") includes a series of panels 12 each connected to or otherwise attached to a length of material or sheet 14. Each panel 12 is shown in FIGS. 1a and 1b as being sewn to the sheet 14 with double stitched hems, but alternatively one or more of the panels 12 may be adhered to the sheet 14 instead.

More particularly, the drop cloth 10 includes a series of eleven panels 12 that are at least semirigid and that have a thickness of about 5 mm. Preferably, each panel 12 is relatively "hard" and preferably comprises an EVA material. Additionally, each panel 12 preferably is 6.25 inches in length and approximately 18 inches in width, and the widthwise edges of adjacent panels 12 preferably are spaced from one another by about 3.25 inches. The sheet 14 and panels 12 are sewn together in a manner that creates fabric hinges or gaps 18 between the structural panels so as to allow the drop cloth 10 to fold in the areas between the panels 12. Outer edges of the two end panels 14 preferably extend along and in proximity to the opposite transverse end edges 16 of the sheet 14, whereby rigid transverse ends of the drop cloth are created.

The sheet 12 itself preferably is 101.25 inches in length and about 18 inches in width. A small extent of the lengthwise edge portions of the sheet 12 are folded back over themselves and over the opposite transverse end edges of each panel 12, whereat each panel 12 is sewn to the lengthwise edge portions of the sheet 12. Each panel 12 further preferably is sewn along its lengthwise edge portions to the sheet 12.

The sheet 12 preferably comprises a combination of a nonwoven material (90 grams) and PE film (30 grams). A nonwoven fabric preferably is used because of the absorbency and wickability characteristics, which are believed to be better than those of a canvas. The sheet 14 preferably comprises a nonwoven fabric material that defines the topside of the drop cloth 10 having a thermo bonded poly undercoat providing a leak-proof barrier. The sheet 14 thereby preferably provides a leak-proof barrier for paint, water, and other liquids that may be used and against spills and drips of which protection is sought.

Each panel 12 preferably is of the same length, width and thickness as the other panels 12. Each panel 12 also preferably has a similar structural integrity and rigidity to that of each other of the panel 12. Being attached or adhered to the sheet 14, each panel 12 is covered thereby predominantly on a top side thereof. The bottom side of each panel 14 predominantly is exposed and preferably provides resistance to sliding or slipping on hardwood floors, staircases, and tile surfaces. The material of the panel 14 also preferably is a non-marking material so that the hardwood floors, staircases, and tile surfaces are not marred by use of the drop cloth 10.

Furthermore, the rigidity is sufficient that the joining of the panels with the sheet results in a fixed and continuous assembly having a generally fixed, straight edge for abutting against a floor board in a linear and snug manner for protecting the hardwood floor, staircase, and tile surface against paint drips and spills. It is believed that use of the straight edge provided thereby eliminates the need to use painters or masking tape to affix the drop cloth to the floor board or to the wall that the drop abuts. The drop cloth can simply be repositioned with one's foot by kicking and sliding it into position.

Each panel also preferably is rectangular. However, it is contemplated that panels could be arranged in other patterns, as well. Exemplary patterns that might be used are shown attached to a sheet in FIG. 21, which is a photograph of a perspective view of a backside of a demo stair drop paint barrier protector when in a fully unfolded configuration and positioned on a floor. It will be appreciated that a variety of different patterns of panels are shown, and that any one pattern of which (or any combination of which) could be used in a series with a sheet for making a stair drop paint barrier protector.

An elastic loop or similar strap or handle preferably is included, by which the multiple panels are bound together in a folder configuration when the drop cloth is not in use. Such a handle may be sewn to the sheet, an end panel, or both. An exemplary such handle is shown, for example, in FIG. 6.

With further consideration to preferred drop cloths, the width preferably is no less than 12 inches but preferably is around 18 to 19 inches. The length preferably is between around 8 feet to around 12 feet. Ideally, the preferred number of like panels and their spacing to one another optimizes the fit of the panels and fabric hinges to standard sizes for stair step, 'stair bull-nose', and step riser as determined by the building codes of each local or regional area. With regard to the drop cloth 10, it is believed that the first 6.25 inch panel 12 will come to rest on a step, the 3.25 inch fabric will extend over the stair bull nose, and the adjoining 6.25 inch panel extend vertically adjacent a step riser when the drop cloth 10 is used on a common staircase.

Preferably, the width is not greater than 19 inches in order to allow coverage of only about half of the staircase (or less) when used, thereby providing for free access up and down the stairs on an uncovered side of the staircase. Moreover, the drop cloth 10 can be easily repositioned on the staircase to cover the other side of the staircase as a result of the rigidity provided by the panels, thereby allowing free access up and down the staircase on the previously covered area.

It further will be appreciated that the drop cloth 10 can be reconfigured such that some, but not all, of the panels 12 are arranged in a stacked pattern or configuration, whereby the overall length of the drop cloth 10 is adjustable. As a result, the drop cloth 10 can be used not only on stairs, but conveniently in tight spaces, such as that found in closets, by fitting the drop cloth to the surface area requiring protection by adjusting (shortening) the total length by folding panels onto one another until the desired coverage is achieved. Additionally, the drop cloth 10 can be similarly used for covering counter tops, cabinets, and vanity surfaces.

FIG. 2 is a photograph of a perspective view of a backside of a prototype stair drop paint barrier protector 50 when in a fully unfolded configuration on top of flooring, and is representative of the schematic illustrations of FIGS. 1a and 1b.

Figure 3:
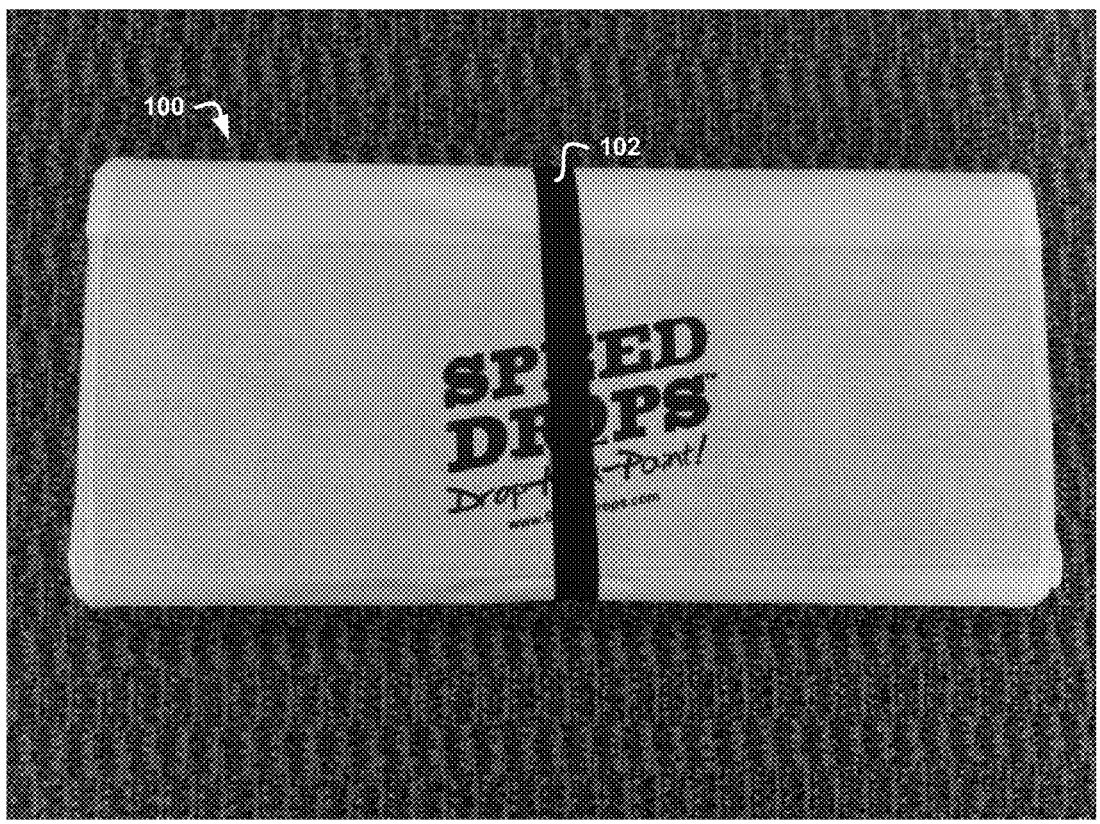
FIG. 3 is a photograph of a perspective view of a top side of a prototype stair drop paint barrier protector when in a fully folded configuration on top of a carpeted floor and retained by an elastic loop extending around a periphery thereof, in accordance with one or more aspects of the present invention.
Figure 4:
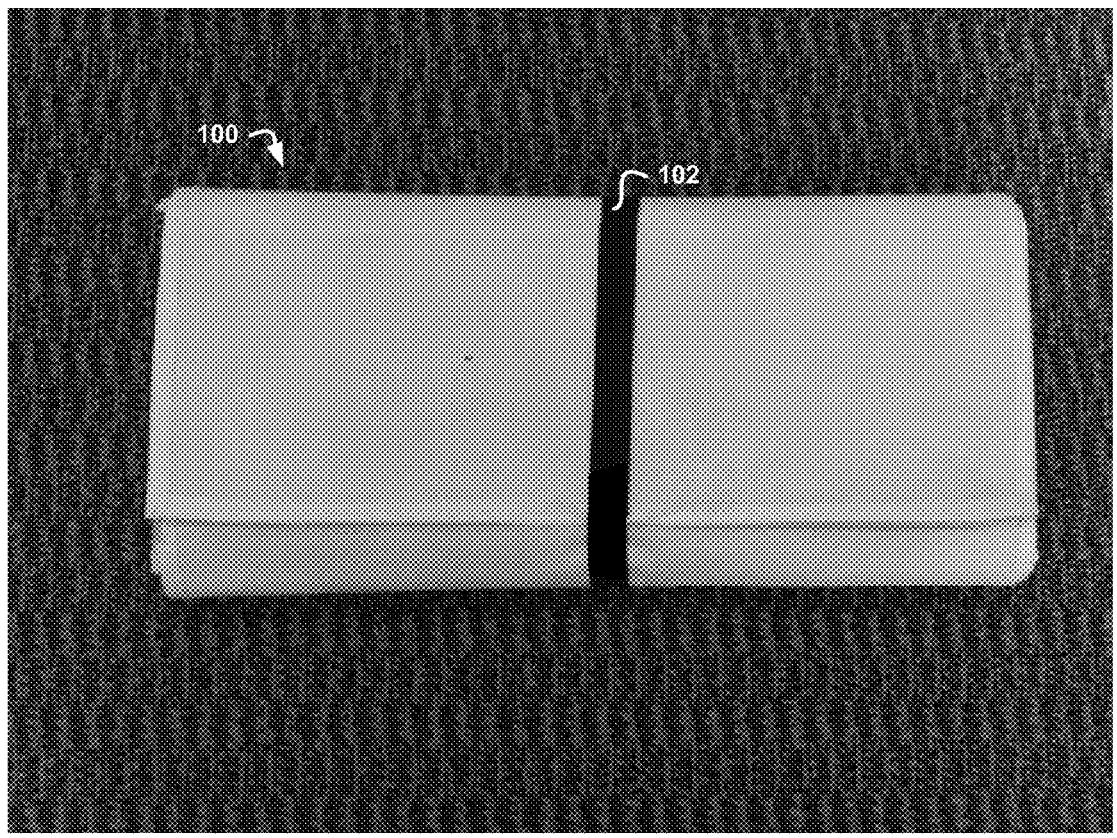
FIG. 4 is a photograph of a perspective view of a backside of the prototype stair drop paint barrier protector of FIG. 3 when in a fully folded configuration and retained by an elastic loop extending around a periphery thereof.
Figure 5:
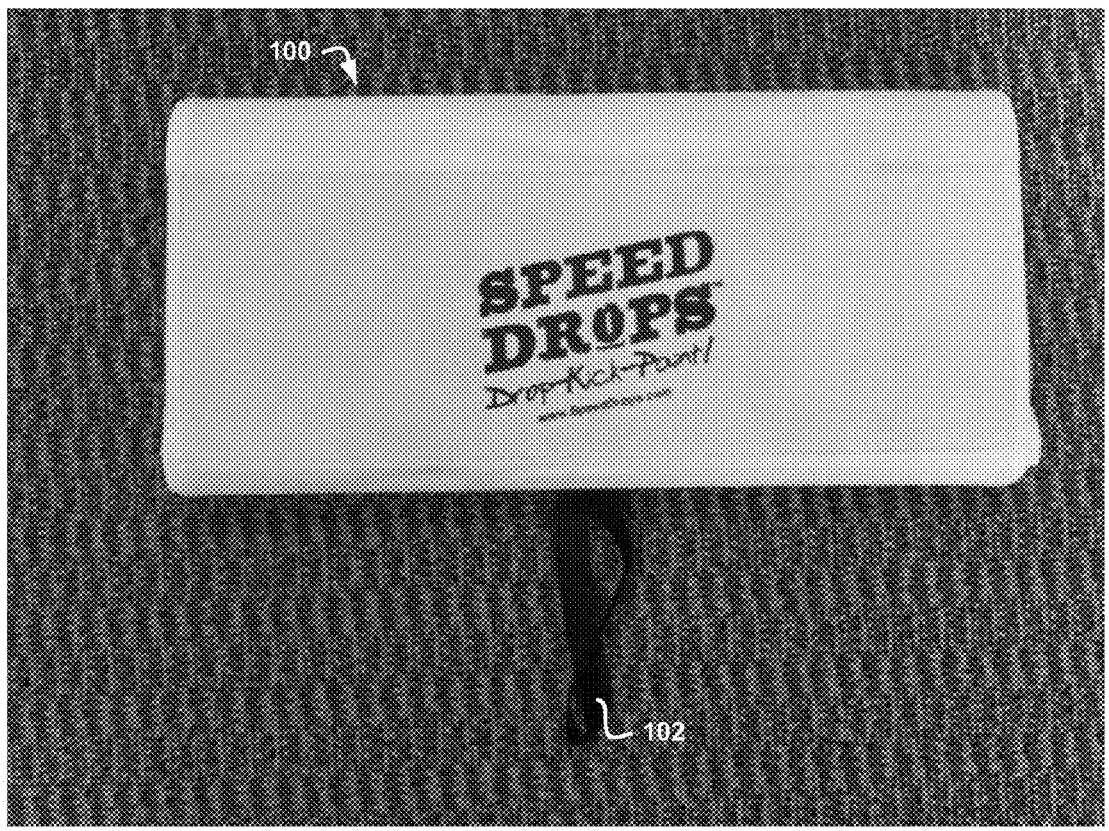
FIG. 5 is a photograph of the perspective view of the top side of the prototype stair drop paint barrier protector of FIG. 3 when no longer retained by the elastic loop extending therearound.
Figure 6:
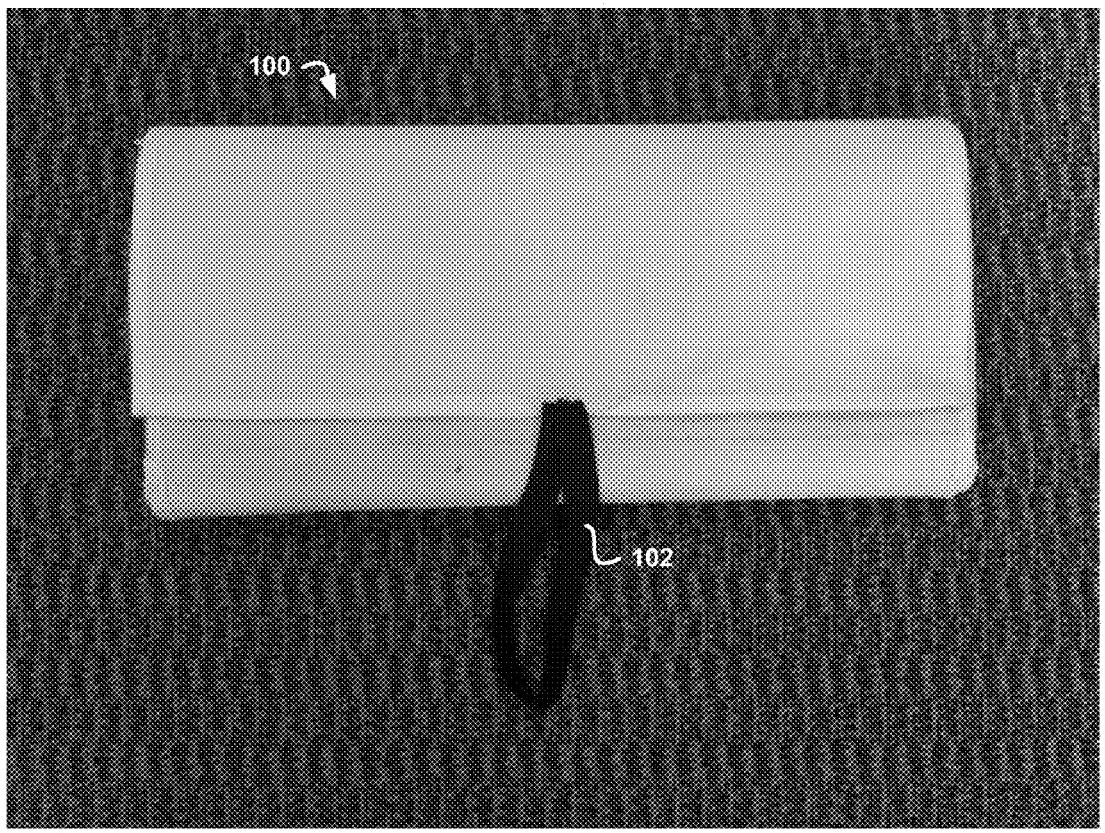
FIG. 6 is a photograph of the perspective view of the backside of the prototype stair drop paint barrier protector of FIG. 5 when no longer retained by the elastic loop extending therearound.

FIG. 3 is a photograph of a perspective view of a top side of a prototype stair drop paint barrier protector 100 when in a fully folded configuration. The prototype 100 is shown on top of a carpeted floor and is retained in the fully folded configuration by an elastic loop or handle 102 that extends around a periphery thereof. The opposite side of the prototype 100 is shown in FIG. 4. FIG. 5 is a photograph of the perspective view of the top side of the prototype 100 when it is no longer retained by the handle 102 extending therearound. Similar to FIG. 4, the opposite side of the prototype 100 in the unrestrained condition is shown in FIG. 6.

Figure 7:
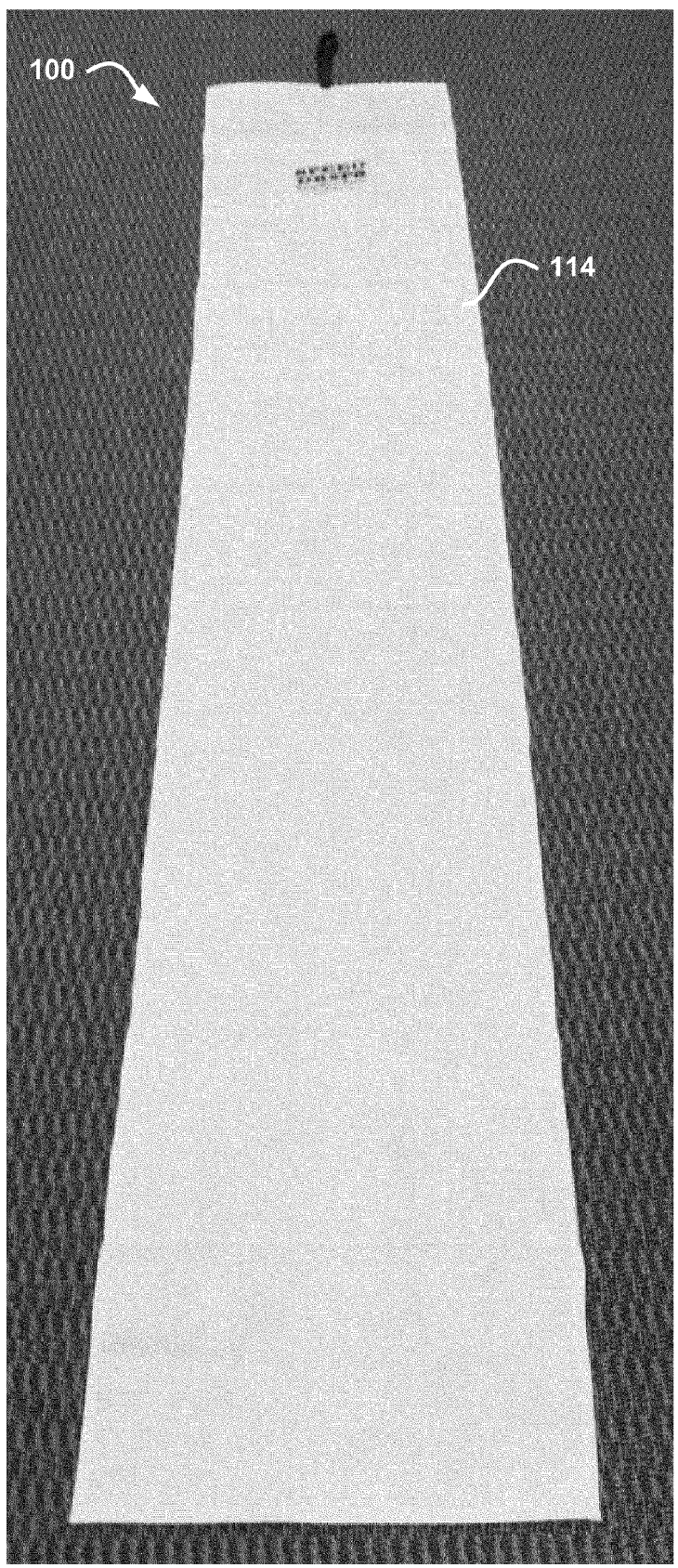
FIG. 7 is a photograph of a perspective view a top side of the prototype stair drop paint barrier protector of FIG. 3 when in the fully unfolded configuration.
Figure 8:
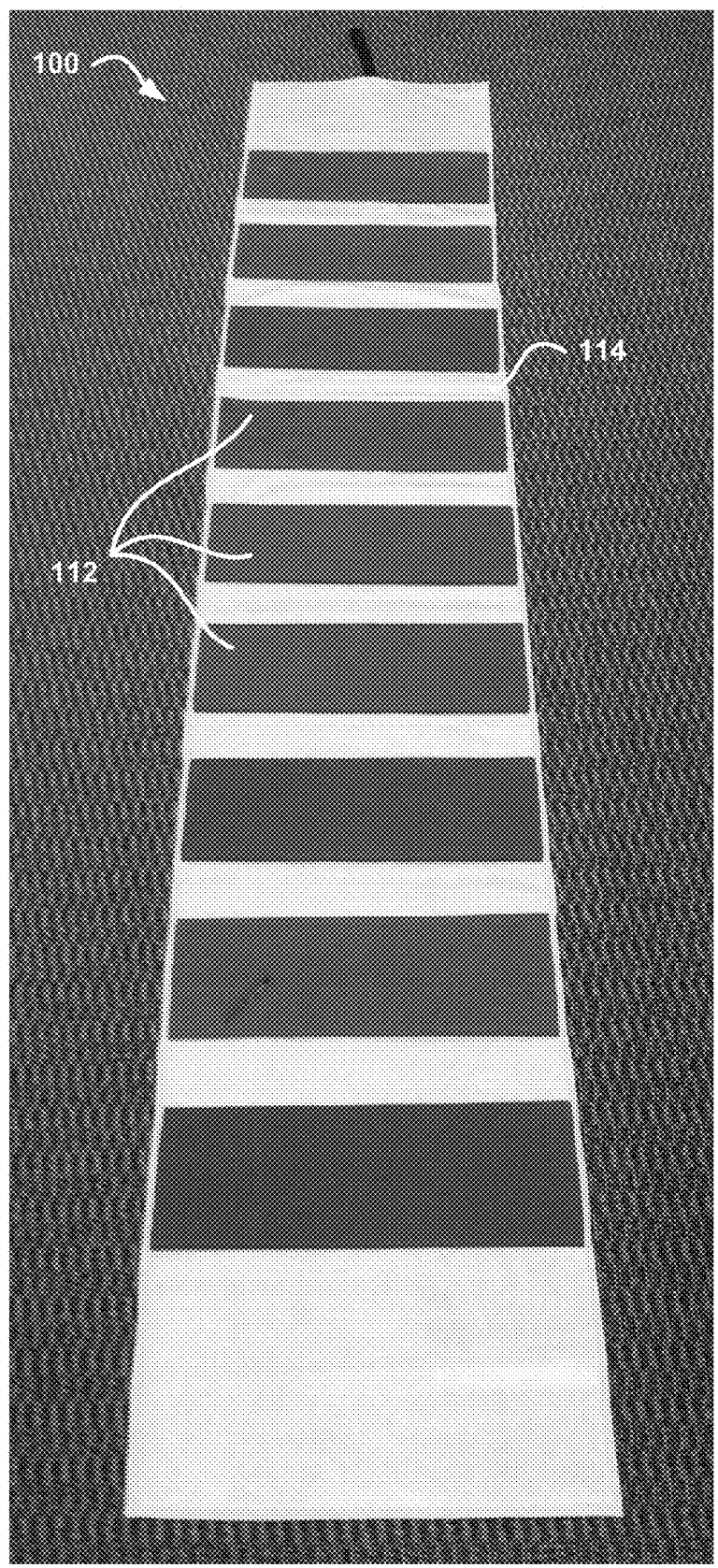
FIG. 8 is a photograph of a perspective view of a backside of the prototype stair drop paint barrier protector of FIG. 7 when in the fully unfolded configuration.
Figure 9:
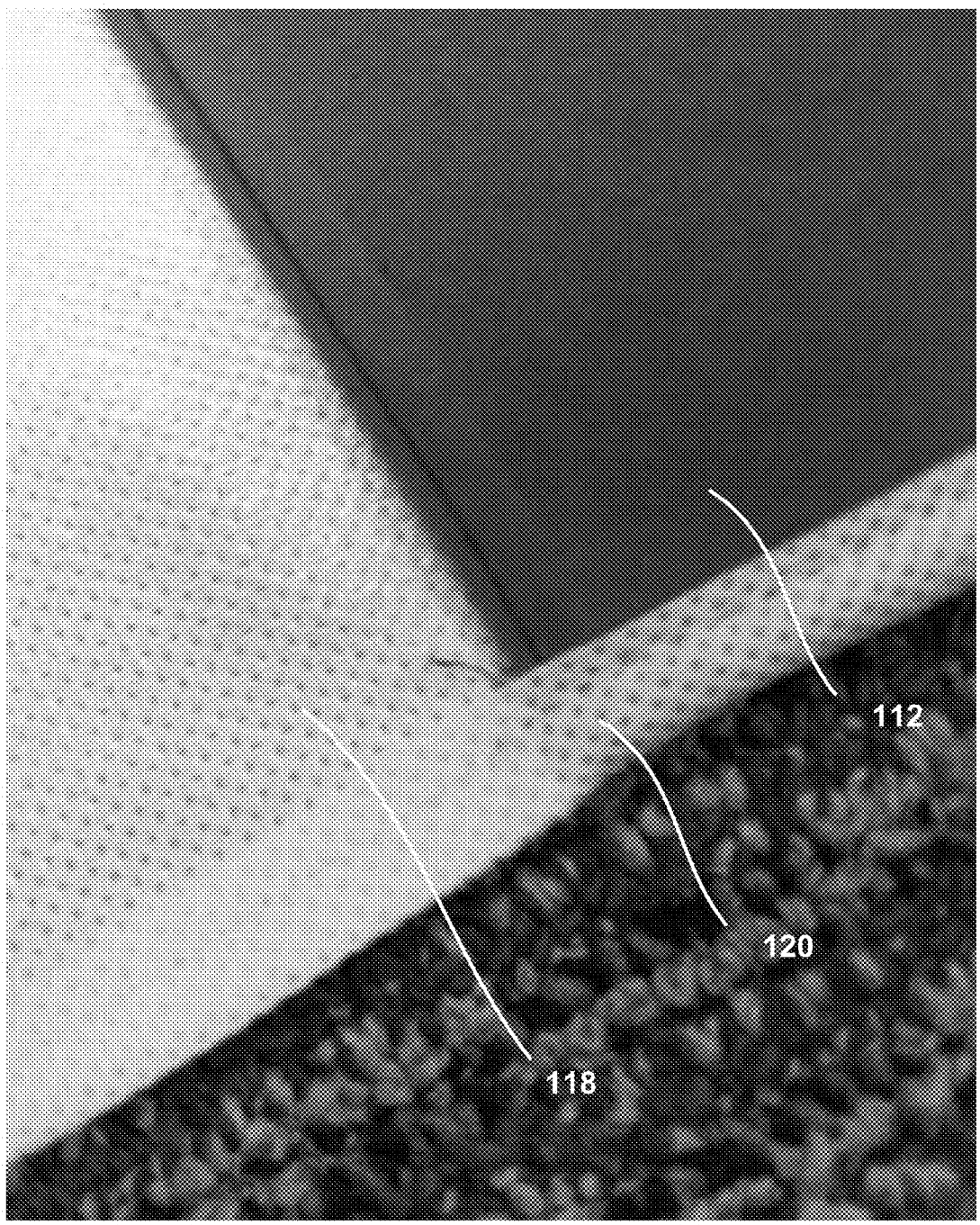
FIG. 9 is a photograph of a close-up of an area of the prototype stair drop paint barrier protector shown in FIG. 8.
Figure 10:
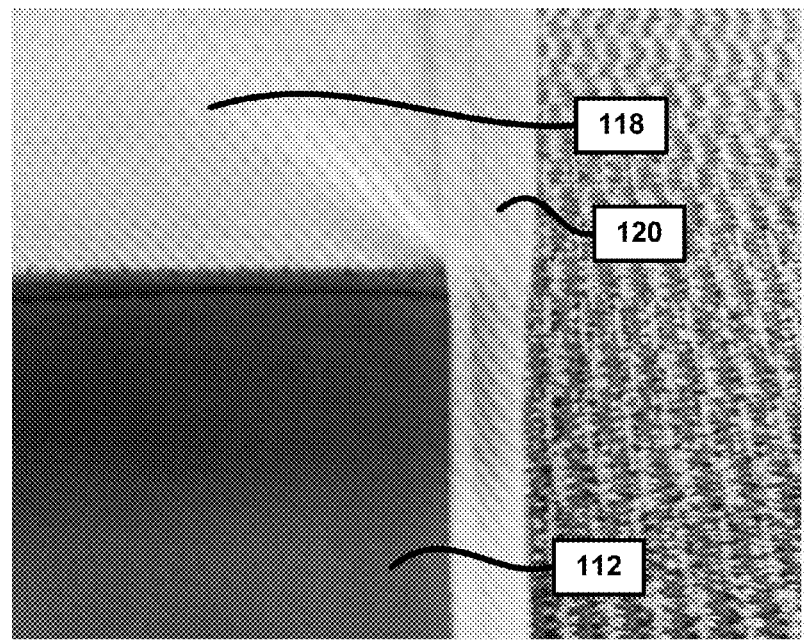
FIG. 10 is a another photograph of a close-up of the area shown in FIG. 9.
Figure 11:
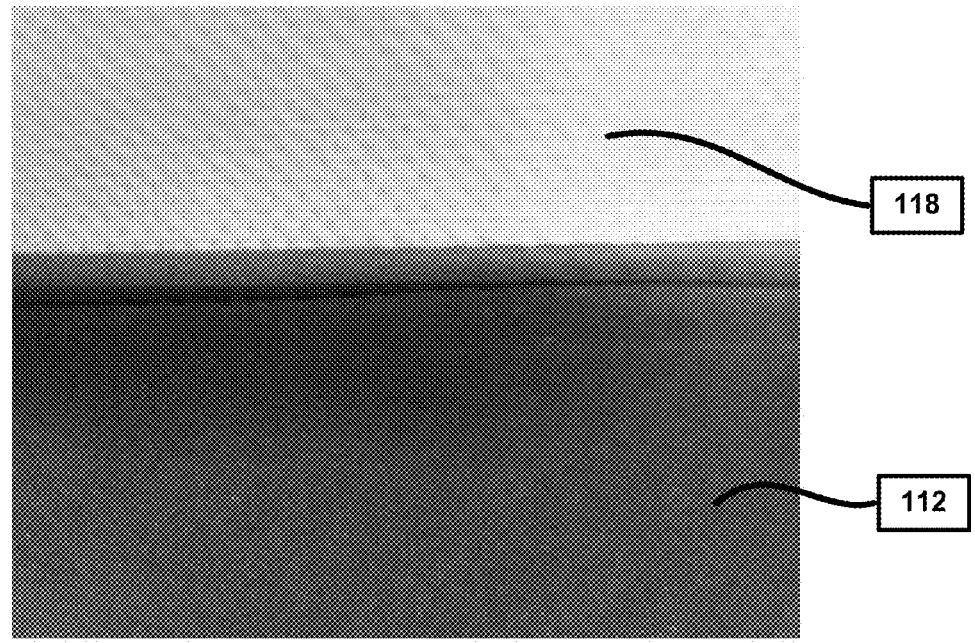
FIG. 11 is a photograph of a close-up of an edge of an EVA panel on the backside of the prototype stair drop paint barrier protector shown in FIG. 8.

FIG. 7 is a photograph of a perspective view a top side of the prototype 100 when in the fully unfolded configuration. FIG. 8 is a photograph of a perspective view of a backside of the prototype 100 when in the fully unfolded configuration. The panels 112 are shown in this view, as the panels 112 are exposed on the backside of the sheet 114. FIG. 9 is a photograph of a close-up of an area of the prototype 100 shown in FIG. 8. In FIG. 9, the overlap 120 of the edge portions of the sheet 114 is perhaps best seen whereat the panels 112 are attached. A fabric hinge 118 that extends between adjacent panels 112 is also illustrated. FIG. 10 is a another photograph of a close-up of the area shown in FIG. 9. FIG. 11 is a photograph of a close-up of an edge of a panel 112 and a hinge 118 on the backside of the sheet 114. As shown here, the panel 112 is also secured to the sheet 114 along its transverse edge.

Figure 12:
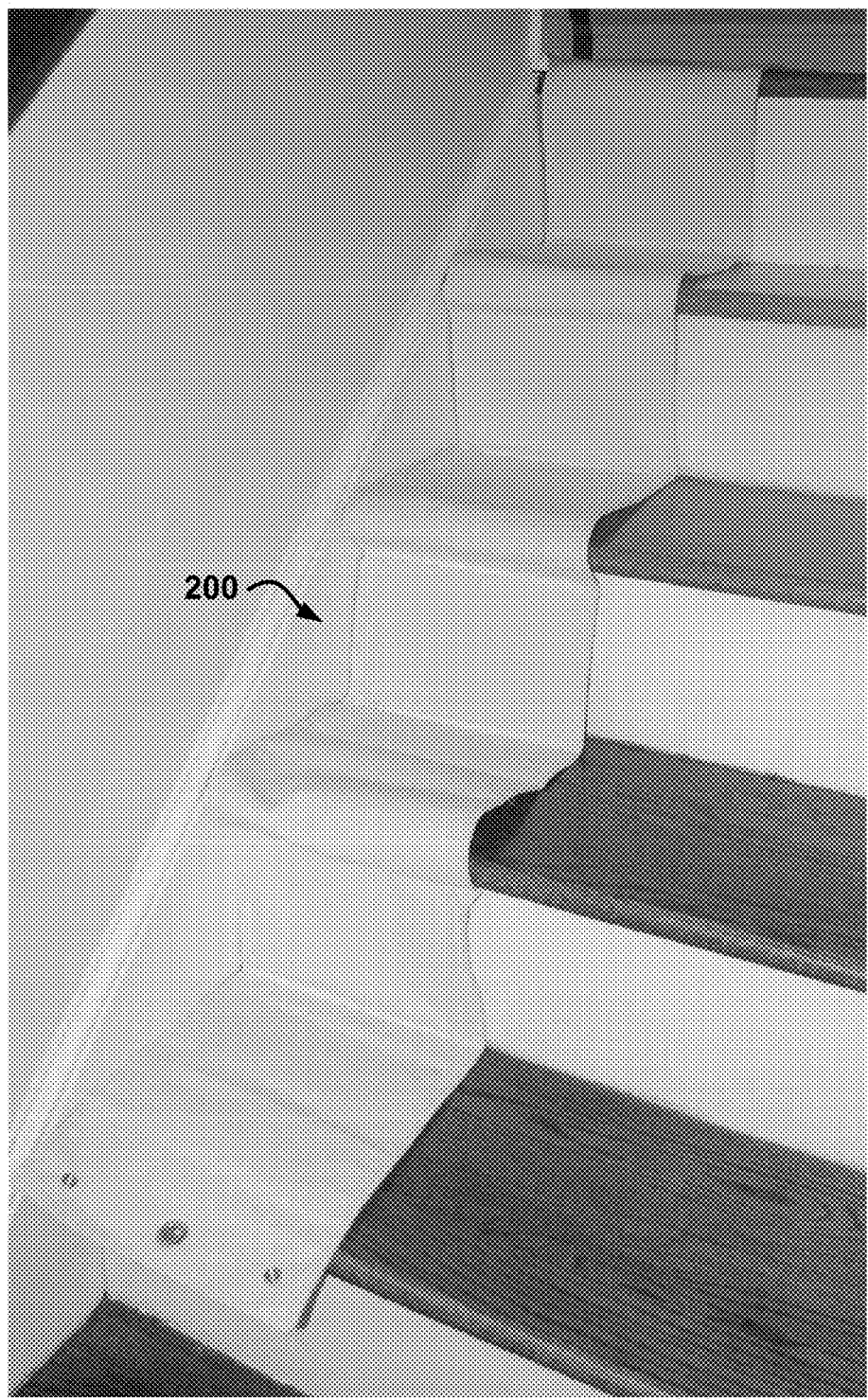
FIG. 12 is a photograph of a perspective view of a top side of another prototype stair drop paint barrier protector when in a fully unfolded configuration and positioned over stairs of a staircase, in accordance with one or more aspects of the present invention.

FIG. 12 is a photograph of a perspective view of a top side of another prototype stair drop paint barrier protector 200 when in a fully unfolded configuration and positioned over stairs of a staircase.

Figure 13:
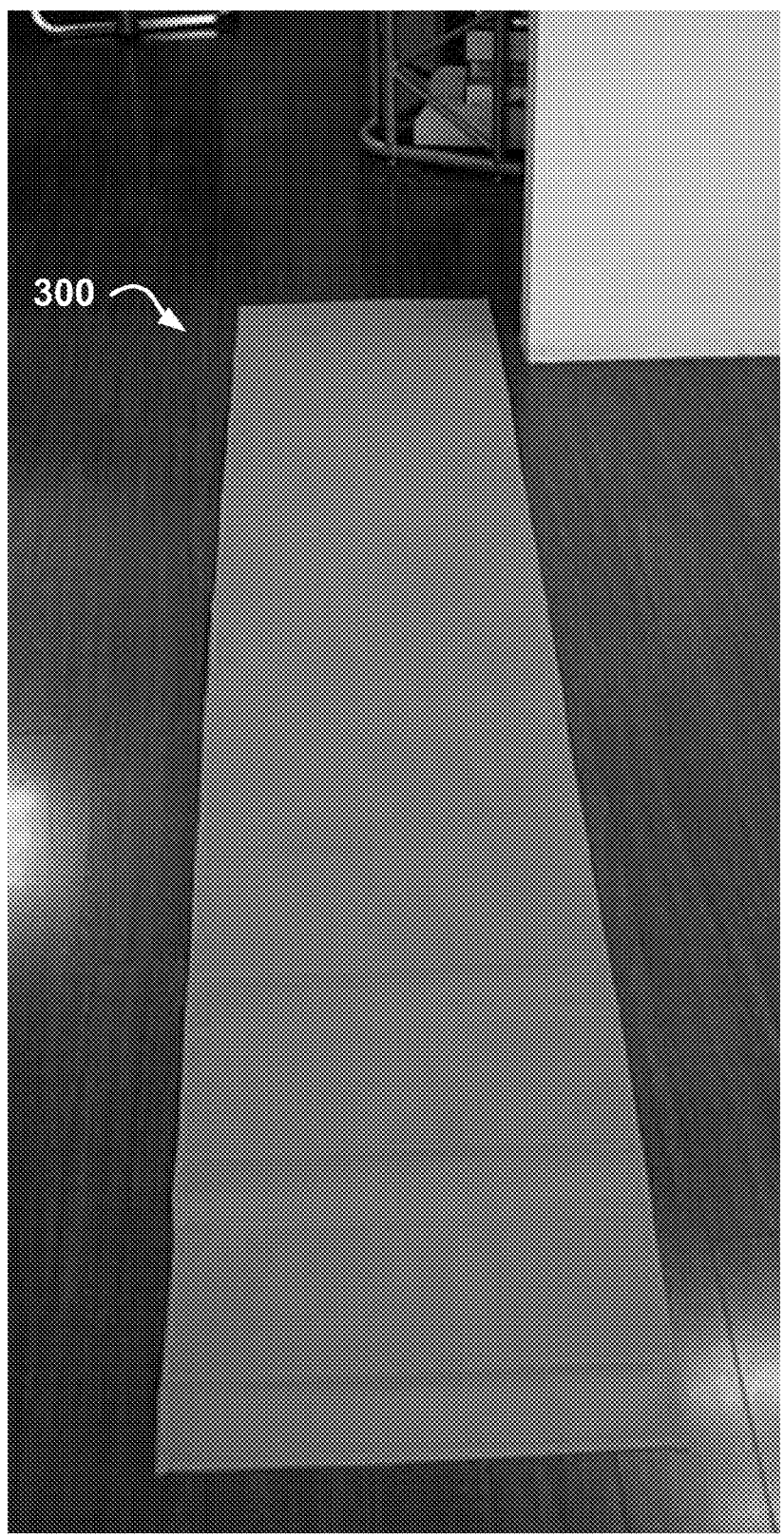
FIG. 13 is a photograph of a perspective view of the top side of another prototype stair drop paint barrier protector when in a fully unfolded configuration and positioned on a hardwood floor.
Figure 14:
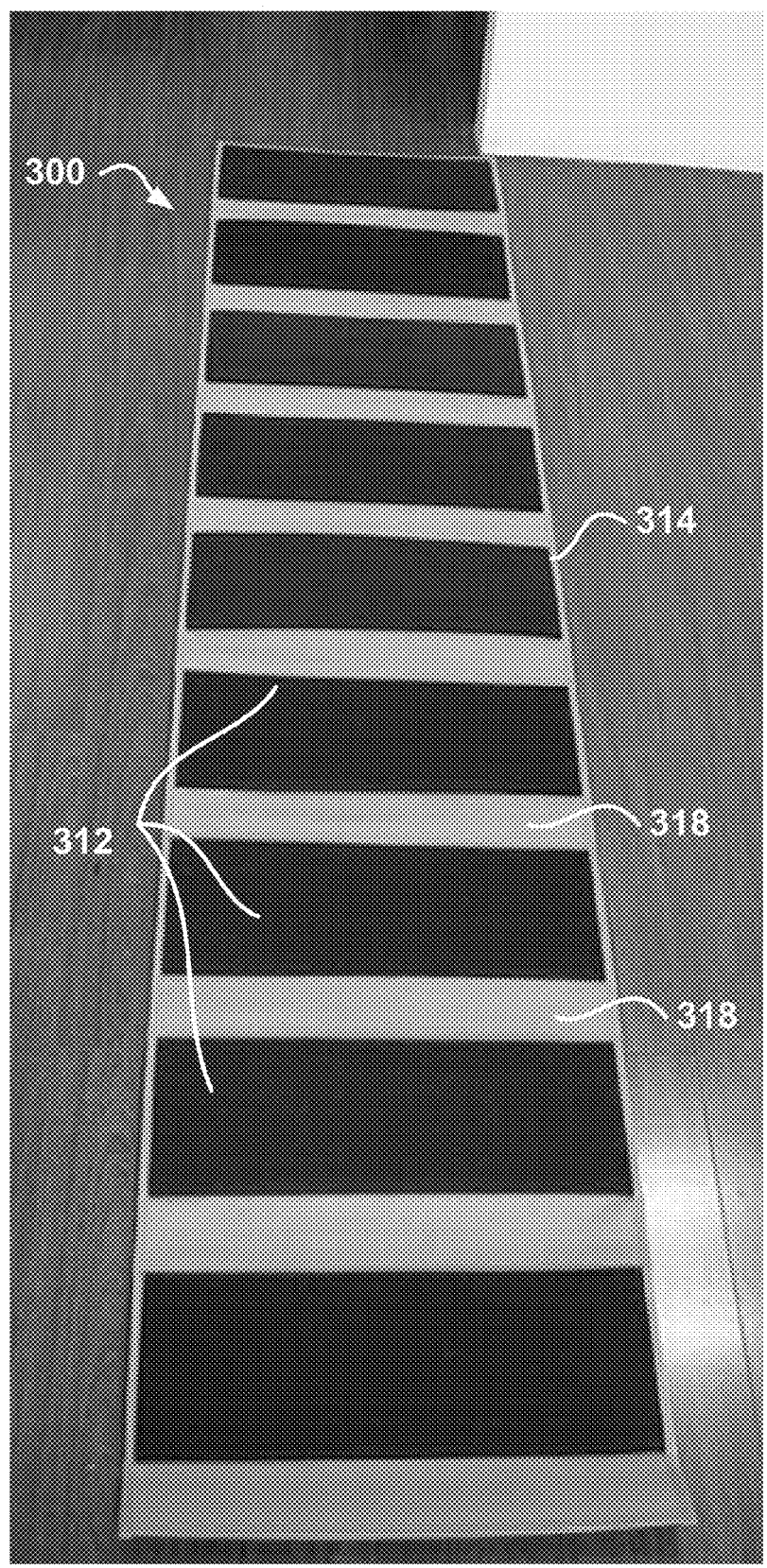
FIG. 14 is a photograph of a perspective view of a backside of the prototype stair drop paint barrier protector of FIG. 13 when in the fully unfolded configuration on the hardwood floor.
Figure 15:
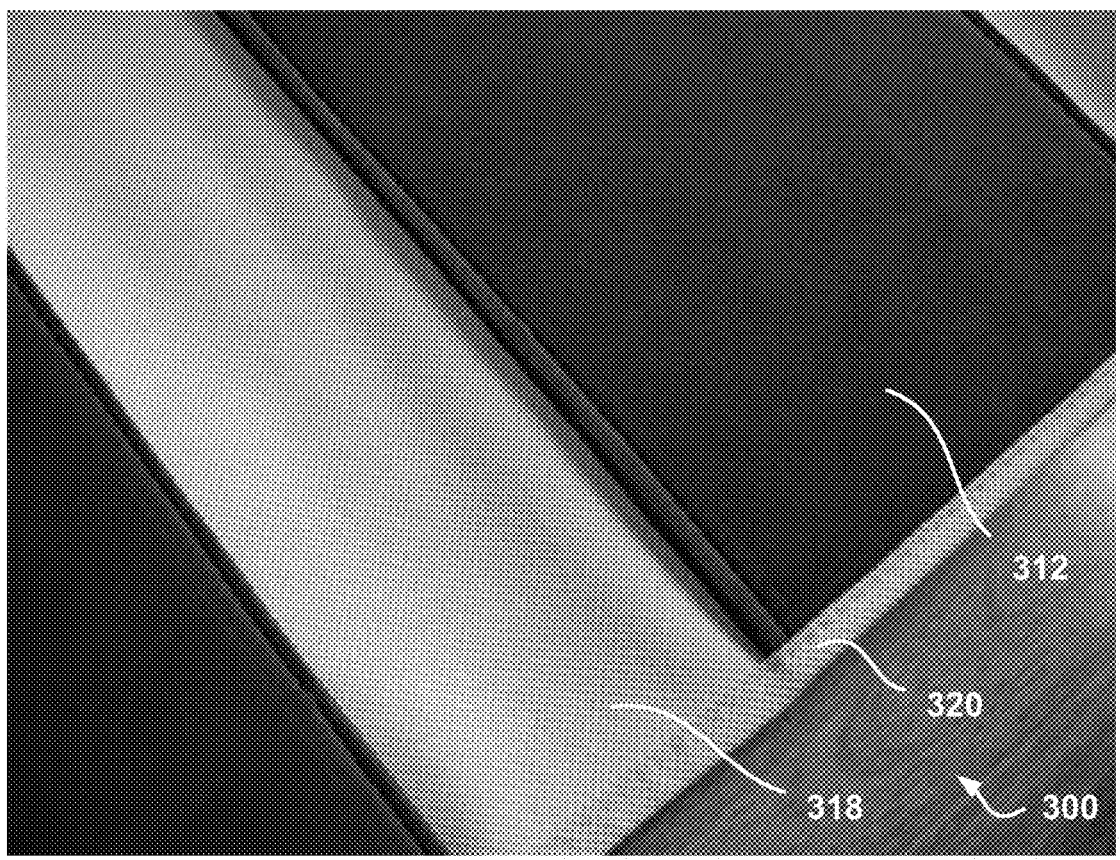
FIG. 15 is a photograph of a close-up of an area of the prototype stair drop paint barrier protector shown in FIG. 14.

FIG. 13 is a photograph of a perspective view of the top side of another prototype 300 when in a fully unfolded configuration and positioned on a hardwood floor, and FIG. 14 is a photograph of a perspective view of a backside of the prototype 300 when in the fully unfolded configuration on the hardwood floor. FIG. 15 is a photograph of a close-up of an area of the prototype 300. As before, the panels 312 are exposed on the backside of the sheet 314, and the panels 112 are attached to the sheet 314 at the overlap of the edge portions 320 of the sheet 314. Fabric hinges 318 also extend between adjacent panels 312.

Figure 16:
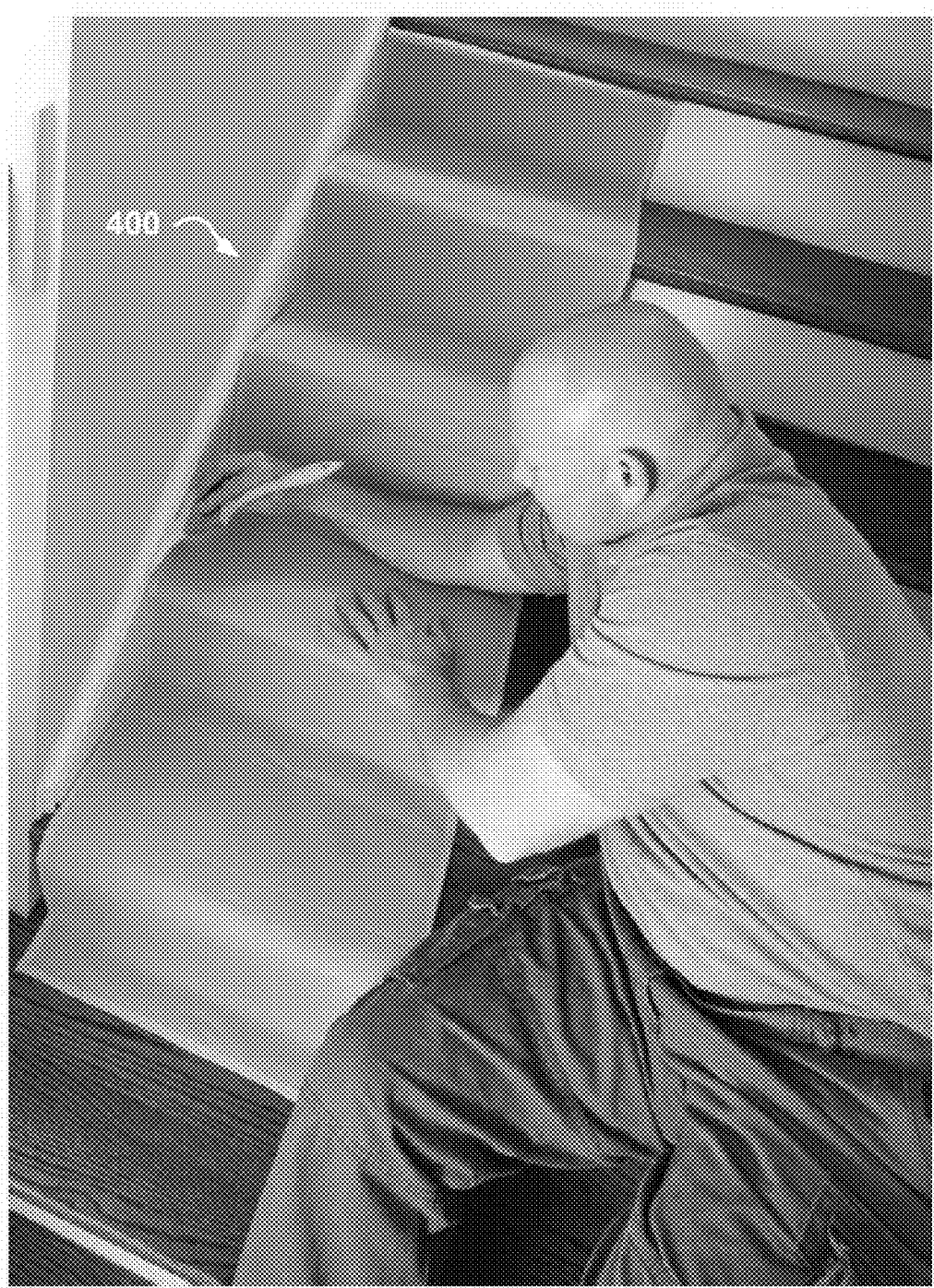
FIG. 16 is a photograph of a perspective view of the top side of another prototype stair drop paint barrier protector when in a fully unfolded configuration and positioned over stairs of a staircase, in accordance with one or more aspects of the present invention.

FIG. 16 is a photograph of a perspective view of the top side of a fourth prototype stair drop paint barrier protector 400 when in a fully unfolded configuration and positioned over stairs of a staircase. The prototype 400 is shown in use during the painting of molding that extends along the stairs.

Figure 17:
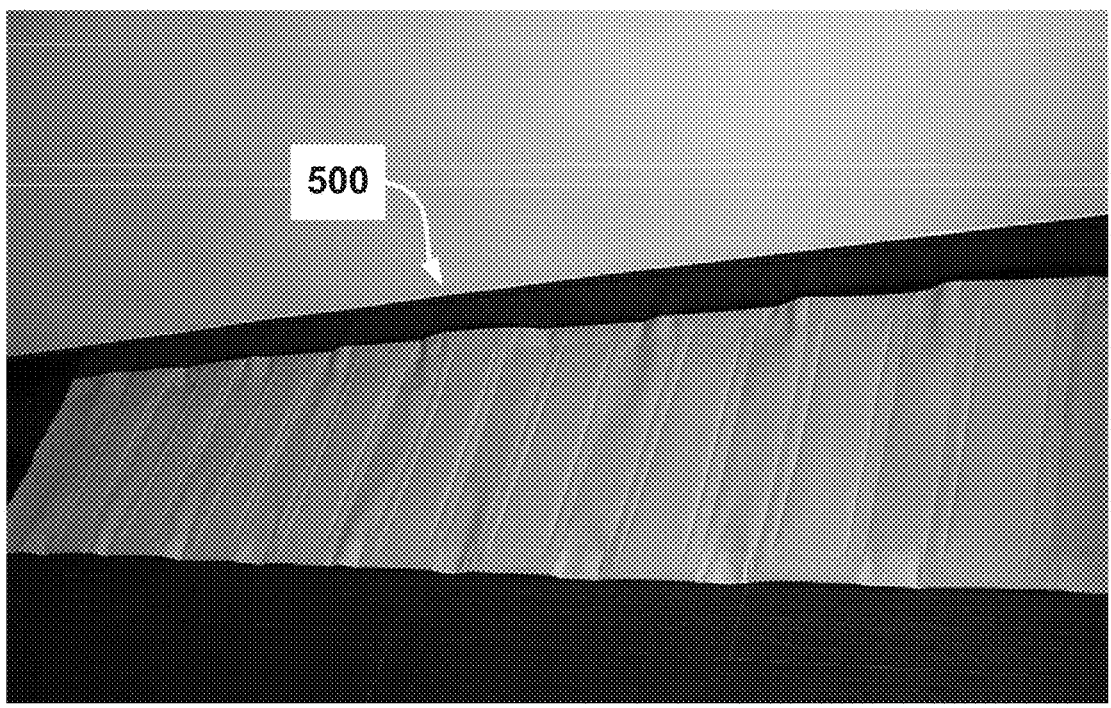
FIG. 17 is a photograph of a perspective view of the top side of another prototype stair drop paint barrier protector when in a fully unfolded configuration and positioned on a hardwood floor.
Figure 18:
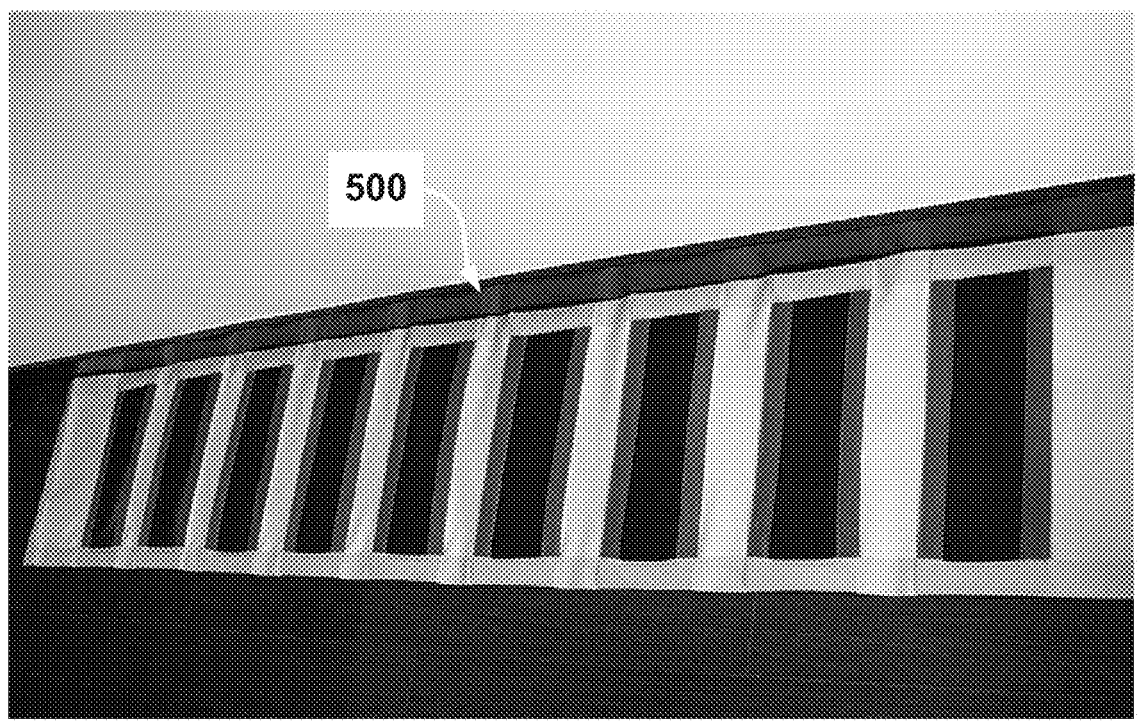
FIG. 18 is a photograph of a perspective view of the backside of the prototype stair drop paint barrier protector of FIG. 17 when in a fully unfolded configuration and positioned on the hardwood floor.
Figure 19:
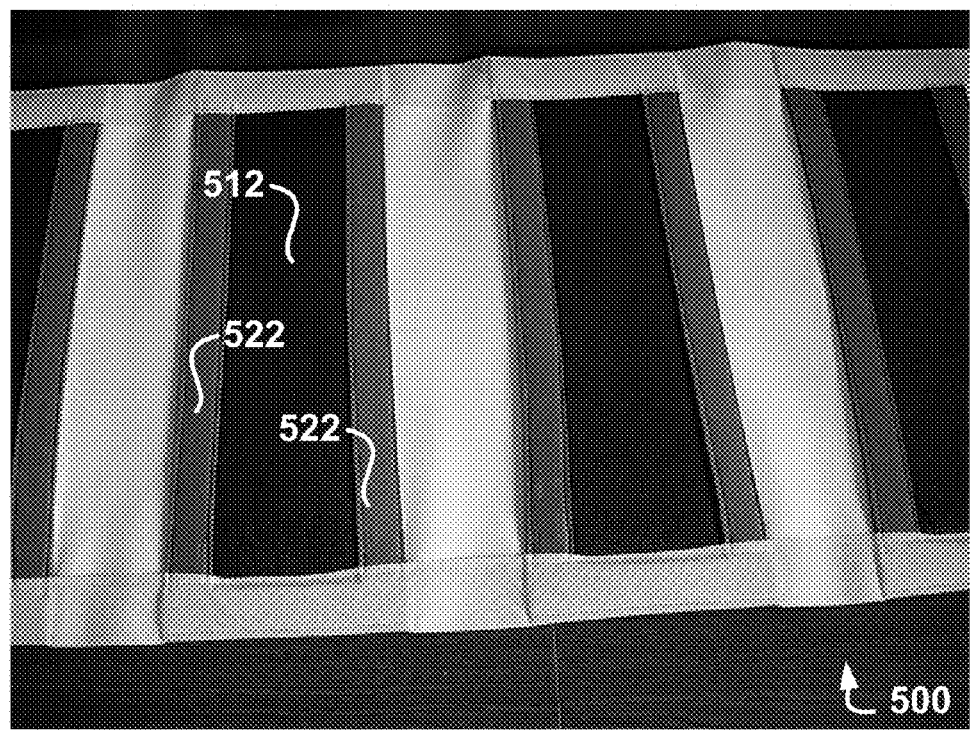
FIG. 19 is a photograph of a close-up view of an area of the prototype stair drop paint barrier protector shown in FIG. 18.
Figure 20:
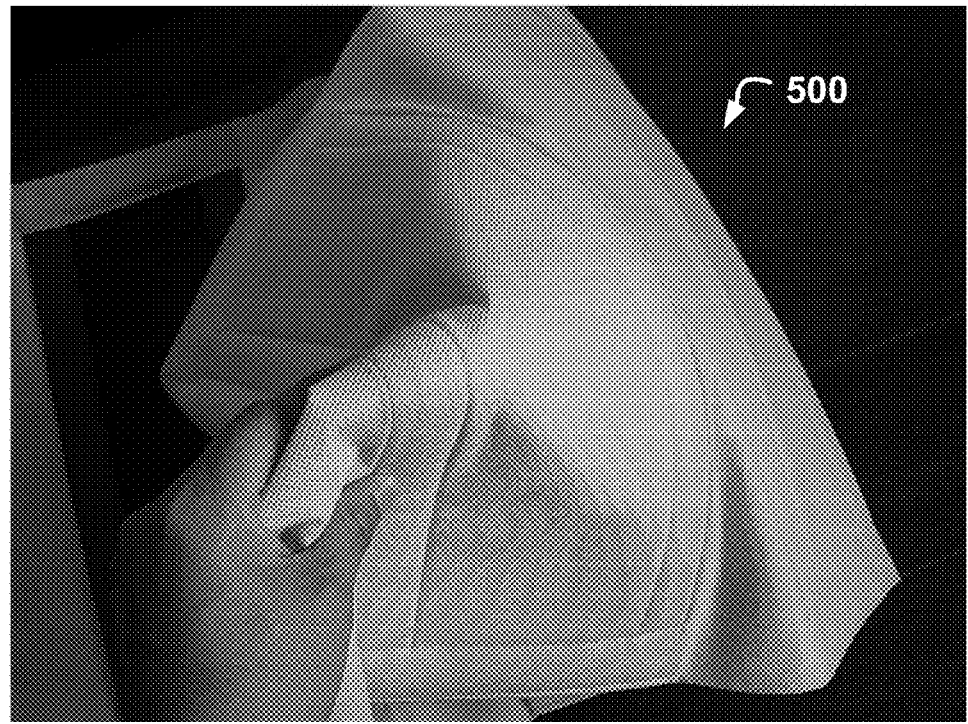
FIG. 20 is a photograph of a perspective view of the prototype stair drop paint barrier protector of FIGS. 17-19 illustrating its flexibility.

FIG. 17 is a photograph of a perspective view of the top side of a fifth prototype stair drop paint barrier protector 500 when in a fully unfolded configuration and positioned on a hardwood floor. FIG. 18 is a photograph of a perspective view of the backside of the prototype 500 when in a fully unfolded configuration and positioned on the hardwood floor, and FIG. 19 is a photograph of a close-up view of an area of the prototype 500 shown in FIG. 18. FIG. 20 is a photograph of a perspective view of the prototype 500 illustrating its flexibility. Indeed, the drop cloth is flexible and bends back to shape after rolling or bending. In the prototype 500, the panels 512 are formed from a foam material rather than an EVA material, but are bounded by rectangular EVA strips 522 that are secured (by sewing) on opposite sides of, and in abutment with, each of the panels 512.

Additional Paint Barrier Protectors

Additional paint barrier protectors are disclosed in the Appendix attached hereto and incorporated by reference herein. Many of these additional embodiments include this basic design of the aforementioned embodiments, which combines a series of structural panels and fabric in various sized drop cloths for specific uses. Indeed, one of these embodiments uses a structural panel material in a manner replicating the sole of a shoe and where the fabric is attached to the panel creating a sock like upper that uses an elastic band or a drawstring top. In this design, the shoe and sock like product are placed on the feet of extension and step ladders to prevent the floors from being scratched. The elastic banding or drawstring keeps the material snugly in place around the ladder feet until removed by the user. The additionally disclosed embodiments include drop cloths comprising specialized patterns that speed the setup and use in the painting of door jams, columns, and in bathrooms around toilets. These drop cloths are desirably made of the same nonwoven material and panel material as described above and may be of thicker material stock. In one of the additional embodiments, a unique pattern is designed so that one or two drop cloths may be used in tandem for multiple special applications, such as on door jams or columns. The design pattern on one side of the drop cloth is sewn to create a notch in the approximate center of a u-shape cutout, which is ideal for fitting snugly up against door jamb trim. On the opposite side of the material is an L-shape cutout that can be combined with a partner template to custom fit the patterned drop cloth around varying sizes of columns with ease. In another embodiment, two material shapes are sewn together as one in a sized specified so as to fit over the tank of a toilet and the seat of the toilet for protecting the toilet from being dripped on when painting in bathrooms.

From the foregoing, it will be appreciated that drop cloths of the present invention provide improved protection and safety over conventional drop cloths commonly used today. Furthermore, based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

For example, the EVA material provides rigidity, non-slip gripping, is light in weight, and is therefore preferred in the embodiment described with reference to the drawings herein. However, it is contemplated that, while not preferred, a range of other materials with similar characteristics to that of EVA may be used to create the structural panels used in accordance with embodiments of the invention. Such other materials include rubber, foam, or paper board.

Additionally, the fabric material in the embodiment described with reference to the drawings herein preferably is a non-woven, engineered fabric and is adhered to the structural panels by stitching. However, it is contemplated that the material can be a cloth material, such as a canvas, and that the panels can be adhered to the material by adhesive glue, or both glue and stitching.

Furthermore, in the embodiment described with reference to the drawings herein, the fabric is sewn onto predominantly one side (i.e., the top side) of the structural panels in a manner that creates a fabric hinge or gap between the structural panels so as to allow the panels to fold onto one another like a book cover. It is additionally contemplated that fabric may also be wrapped and sewn to the underside edge of the structural panels. The engineered fabric is desired for its strength, durability, and balance of drip absorption and repellency. The panels at opposite end desirably have handles attached at each end for portability when folded. One or more embodiments of the invention also could include pockets or straps sewn onto the drop cloth for the carrying of common paint tools or other utensils.

In yet another variation of embodiments of the present invention, panels of a drop cloth, rather than being sewn to the sheet of fabric, are inserted and sewn or glued between two sheets.

What is claimed is:

1. A drop cloth and a staircase in combination, comprising:
    (a) a drop cloth comprising,
        (1) an elongate foldable sheet of material having a length and a width, wherein the length is substantially greater than the width; and
        (2) a plurality of panels connected to the sheet in series, the panels being spaced apart from each other along the length of the sheet and providing a sufficient rigidity to the drop cloth to enable the drop cloth to be kicked into a position in which the drop cloth defines a generally straight edge along its length; and
    (b) a staircase comprising a plurality of stairs;
    (c) wherein the drop cloth covers stairs of the staircase a first subset of panels of the plurality of panels covers horizontal sections of the stairs and a second subset of panels of the plurality of panels covers vertical sections of the staircase, with a portion of the sheet of material extending between a panel of the first subset and a panel of the second subset folding over an edge of one of the stairs of the staircase.

2. The drop cloth and staircase combination of claim 1, wherein each panel is formed of ethylene vinyl acetate.

3. The drop cloth and staircase combination of claim 1, wherein a width of the drop cloth is configured to cover no more than about half of a width of the stairs of the staircase.

4. A drop cloth, comprising:
    (a) an elongate sheet of material having a length and a width, wherein the length is substantially greater than the width; and
    (b) a series of panels, each panel being connected to the sheet in series along the length of the sheet;
    (c) wherein the panels generally are identical to one another and equally spaced along the length of the sheet such that, when the drop cloth is applied to a staircase, a first panel of a pair of panels covers a horizontal section of a particular one of the stairs of the staircase and a second panel of the pair of panels covers a vertical section of the stairs of the staircase, with an area of the sheet of material, which extends between the first and second panels, folding over an edge of the particular one of the stairs; and
    (d) wherein the sheet and panels are sewn together in a manner that creates hinges between the panels so as to allow the drop cloth to fold in the areas between the panels, the extent of the areas between the panels being less than a length of the panels.

5. The drop cloth of claim 4, wherein each panel is sewn to an underside of the sheet of material and is exposed on the underside of the sheet of material.

6. The drop cloth of claim 4, wherein each panel is adhered to an underside of the sheet of material and is exposed on the underside of the sheet of material.

7. The drop cloth of claim 4, wherein the sheet has a length of about 101.25 inches and a width of about 18 inches; wherein each panel has a thickness of about 5 mm; wherein each panel is about 6.25 inches in length and about 18 inches in width; and wherein the extent of the areas between the panels is about 3.25 inches.

8. The drop cloth of claim 4, wherein outer edges of two panels extend along and in proximity to opposite transverse end edges of the sheet of material so as to define rigid transverse ends of the drop cloth.

9. The drop cloth of claim 4, wherein the sheet of material comprises a combination of a nonwoven material and polythene material.

10. The drop cloth of claim 4, wherein the sheet of material comprises a nonwoven fabric that defines a topside of the drop cloth, and wherein a thermo bonded poly undercoat of the nonwoven fabric provides a leak-proof barrier of the sheet.

11. The drop cloth of claim 4, wherein a bottom side of each panel is exposed and provides resistance to sliding or slipping on hardwood floors, staircases, and tile surfaces.

12. The drop cloth of claim 4, wherein a rigidity of each panel is sufficient such that the drop cloth has a generally straight edge along its length for abutting against a floor board in a linear and snug manner for protecting a hardwood floor, staircase, or tile surface against paint drips and spills.

13. The drop cloth of claim 4, wherein a rigidity of each panel is sufficient such that the drop cloth can be repositioned with one's foot by kicking and sliding it into position.

14. The drop cloth of claim 4, wherein each panel comprises ethylene vinyl acetate.

15. A drop cloth, comprising:
(a) an elongate sheet of material having a length and a width, wherein the length is substantially greater than the width; and
(b) a series of panels, each panel being connected to the sheet in series along the length of the sheet;
(c) wherein the panels generally are identical to one another and equally spaced along the length of the sheet such that, when the drop cloth is applied to a staircase, a first panel of a pair of panels covers a horizontal section of a particular one of the stairs of the staircase and a second panel of the pair of panels covers a vertical section of the stairs of the staircase, with an area of the sheet of material, which extends between the first and second panels, folding over an edge of the particular one of the stairs; and
(d) wherein an extent of lengthwise edge portions of the sheet of material are folded back over themselves and over opposite transverse end edges of each panel, whereat each panel is sewn to the lengthwise edge portions of the sheet.

16. The drop cloth of claim 15, wherein each panel comprises ethylene vinyl acetate.

17. A drop cloth, comprising:
(a) an elongate sheet of material having a length and a width, wherein the length is substantially greater than the width; and
(b) a series of panels, each panel being connected to the sheet in series along the length of the sheet;
(c) wherein the panels generally are identical to one another and equally spaced along the length of the sheet such that, when the drop cloth is applied to a staircase, a first panel of a pair of panels covers a horizontal section of a particular one of the stairs of the staircase and a second panel of the pair of panels covers a vertical section of the stairs of the staircase, with an area of the sheet of material, which extends between the first and second panels, folding over an edge of the particular one of the stairs; and
(d) wherein each panel is sewn along lengthwise edge portions to the sheet of material and defines straight edge portions of the drop cloth.

18. The drop cloth of claim 17, wherein each panel comprises ethylene vinyl acetate.

19. A drop cloth, comprising:
(a) an elongate sheet of material having a length and a width, wherein the length is substantially greater than the width; and
(b) a series of panels, each panel being connected to the sheet in series along the length of the sheet;
(c) wherein the panels generally are identical to one another and equally spaced along the length of the sheet such that, when the drop cloth is applied to a staircase, a first panel of a pair of panels covers a horizontal section of a particular one of the stairs of the staircase and a second panel of the pair of panels covers a vertical section of the stairs of the staircase, with an area of the sheet of material, which extends between the first and second panels, folding over an edge of the particular one of the stairs; and
(d) further comprising an elastic loop, strap, or handle which is sewn to the sheet, an end panel, or both, and by which the multiple panels are bound together in a folded configuration when the drop cloth is in a fully folded configuration.

20. The drop cloth of claim 19, wherein each panel comprises ethylene vinyl acetate.

* * * * *